(12) United States Patent
McKenney et al.

(10) Patent No.: US 6,615,316 B1
(45) Date of Patent: Sep. 2, 2003

(54) USING HARDWARE COUNTERS TO ESTIMATE CACHE WARMTH FOR PROCESS/THREAD SCHEDULERS

(75) Inventors: Paul E. McKenney, Beaverton, OR (US); Phillip E. Krueger, Lake Oswego, OR (US)

(73) Assignee: International Business Machines, Corporation, Armonk, NY (US)

( * ) Notice: Subject to any disclaimer, the term of this patent is extended or adjusted under 35 U.S.C. 154(b) by 29 days.

(21) Appl. No.: 09/715,444

(22) Filed: Nov. 16, 2000

(51) Int. Cl.⁷ .............................................. G06F 12/00

(52) U.S. Cl. ...................... 711/118; 709/102

(58) Field of Search .................. 711/118, 133, 711/136; 709/102, 108

(56) References Cited

U.S. PATENT DOCUMENTS

| | | | | |
|---|---|---|---|---|
| 5,185,861 A | * | 2/1993 | Valencia | 711/120 |
| 5,287,508 A | * | 2/1994 | Hejna, Jr. et al. | 709/102 |
| 6,073,225 A | * | 6/2000 | James et al. | 711/202 |
| 6,243,788 B1 | * | 6/2001 | Franke et al. | 711/3 |

OTHER PUBLICATIONS

Kim et al., A Virtual Cache Scheme For Improving Cache Affinity . . . , Abstract, Proceedings of HPCS '98: 12th Annual International Symposium on High Performance Computing Systems.

Squillante, et al., Using Processor–Cache Affinity Information . . . , Feb. 1993, pp 131–143.

\* cited by examiner

Primary Examiner—Dohyun Yoo
Assistant Examiner—Nasser Moazzami
(74) Attorney, Agent, or Firm—Lieberman & Brandsdorfer

(57) ABSTRACT

A method and computer system for estimating cache warmth for thread schedulers in a processor of a multiprocessor system. A mathematical model based upon a Markov Model of queuing theory is used to determine flow probability. The method incorporates data received from cache counters to measure cache hits, cache misses, cache invalidations and cache roll-outs. Based upon the Model and the data received from the counters and the assumption that cache decays exponentially, a nominal lifetime of a cache line is computed and the state of the system is manipulated in accordance with the computed lifetime of the cache line. The method may be applied to either a two way LRU cache or a four way LRU cache for computing an average lifetime of a cache line. Accordingly, cache affinity and thread migration decisions are enhanced thereby providing an efficient method of operating a computer system.

37 Claims, 5 Drawing Sheets

Transient Cache-Fill Markov Model (I, O, N), where:

I: Invalid line
O: Old line
N: New line m: miss rate per line
i: inv.+rollout rate per line
o: other CPUs' miss rate per line

USING HARDWARE COUNTERS TO ESTIMATE CACHE WARMTH FOR PROCESS/THREAD SCHEDULERS

BACKGROUND OF THE INVENTION

1. Technical Field

This invention relates to a computer system and method of estimating cache warmth for thread schedulers in a processor. More specifically, the invention determine how much of a thread's context is contained in a particular cache to enhance cache affinity and thread migration decision in an operating system kernel.

2. Description Of The Prior Art

Multiprocessor systems by definition contain multiple processors, also referred to herein as CPUs, that can execute multiple processes or multiple threads within a single process simultaneously, in a manner known as parallel computing. In general, multiprocessor systems execute multiple processes or threads faster than conventional uniprocessor systems, such as personal computers (PCs), that execute programs sequentially. The actual performance advantage is a function of a number of factors, including the degree to which parts of a multithreaded process and/or multiple distinct processes can be executed in parallel and the architecture of the particular multiprocessor system at hand. One critical factor is the caches that are present in modern multiprocessors. Cache memories store data frequently or recently executed by their associated processors. A cache is said to be warm with respect to a particular process when it contains data required for the execution of the process. Conversely, a cache is said to be cold relative to a particular process when it contains little or no data required for the execution of that process. When a cache is cold, access to the cache will miss. Accordingly, performance can be optimized by running processes and threads on CPUs whose caches already contain the memory that those processes and threads are going to be using.

Shared memory multiprocessor systems offer a common physical memory address space that all processors can access. Multiple processes therein, or multiple threads within a process, can communicate through shared variables in memory which allow the processes to read or write to the same memory location in the computer system. Message passing multiprocessor systems, in contrast to shared memory systems, have a distinct memory space for each processor. Accordingly, messages passing through multiprocessor systems require processes to communicate through explicit messages to each other.

The architecture of shared memory multiprocessor systems may be classified by how their memory is physically organized. In distributed shared memory (DSM) machines, the memory is divided into modules physically placed near one or more processors, typically on a processor node. Although all of the memory modules are globally accessible, a processor can access local memory on its node faster than remote memory on other nodes. Because the memory access time differs based on memory location, such systems are also called non-uniform memory access (NUMA) machines. In centralized shared memory machines, on the other hand, the memory is physically in one location. Centralized shared memory computers are called uniform memory access (UMA) machines because the memory is equidistant in time for each of the processors. Both forms of memory organization typically use high-speed caches in conjunction with main memory to reduce execution time.

The use of NUMA architecture to increase performance is not restricted to NUMA machines. A subset of processors in an UMA machine may share a cache. In such an arrangement, even though the memory is equidistant from all processors, data can circulate among the cache-sharing processors faster (i.e., with lower latency) than among the other processors in the machine. Algorithms that enhance the performance of NUMA machines can thus be applied to any multiprocessor system that has a subset of processors with lower latencies. These include not only the noted NUMA and shared-cache machines, but also machines where multiple processors share a set of bus-interface logic as well as machines with interconnects that "fan out" (typically in hierarchical fashion) to the processors.

The James et al. U.S. Pat. No. 6,073,225 teaches a method of optimizing memory and process assignments in NUMA computer systems. James et al. describes a method for collecting hardware statistics in hardware counters. The Hejna, Jr. et al. U.S. Pat. No. 5,287,508 teaches a method and apparatus for driving scheduling decisions off of a cache miss counter. The system disclosed schedules processes according to the priority of the process as well as the cache miss count associated with a particular processor.

However, there is a need for a computer system comprising multiple processors and an improved method of estimating cache warmth, and manipulating the state of the system based upon the lifetime of the cache line. Accordingly, an efficient yet accurate mathematical model is desirable for incorporating hardware counter information for estimating cache warmth of a processor and utilizing the estimate information to schedule processes on a processor.

SUMMARY OF THE INVENTION

It is therefore an object of the invention to provide a method of operating a computer system comprising multiple processors. It is a further object of the invention to provide a method of creating a mathematical model to estimate cache warmth and utilize information obtained from hardware counters to more accurately build the model. The system utilizes hardware measurements of cache related events, including misses, invalidations, hits and rollout counters in a model of cache behavior. The information gathered from the model is then used to estimate the amount of state that a given process or thread has in a given CPU or node cache. Based upon the information obtained from the hardware counters and generated by the model, changes in the use of computing resources are made, including scheduling processes on a processor, transferring processes between processors, moving memory among processor nodes, and retargetting interrupt handlers from one processor to another. Other objects of the invention includes providing a computer system and article of manufacture for use with the model for estimating cache warmth.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Figure 1:
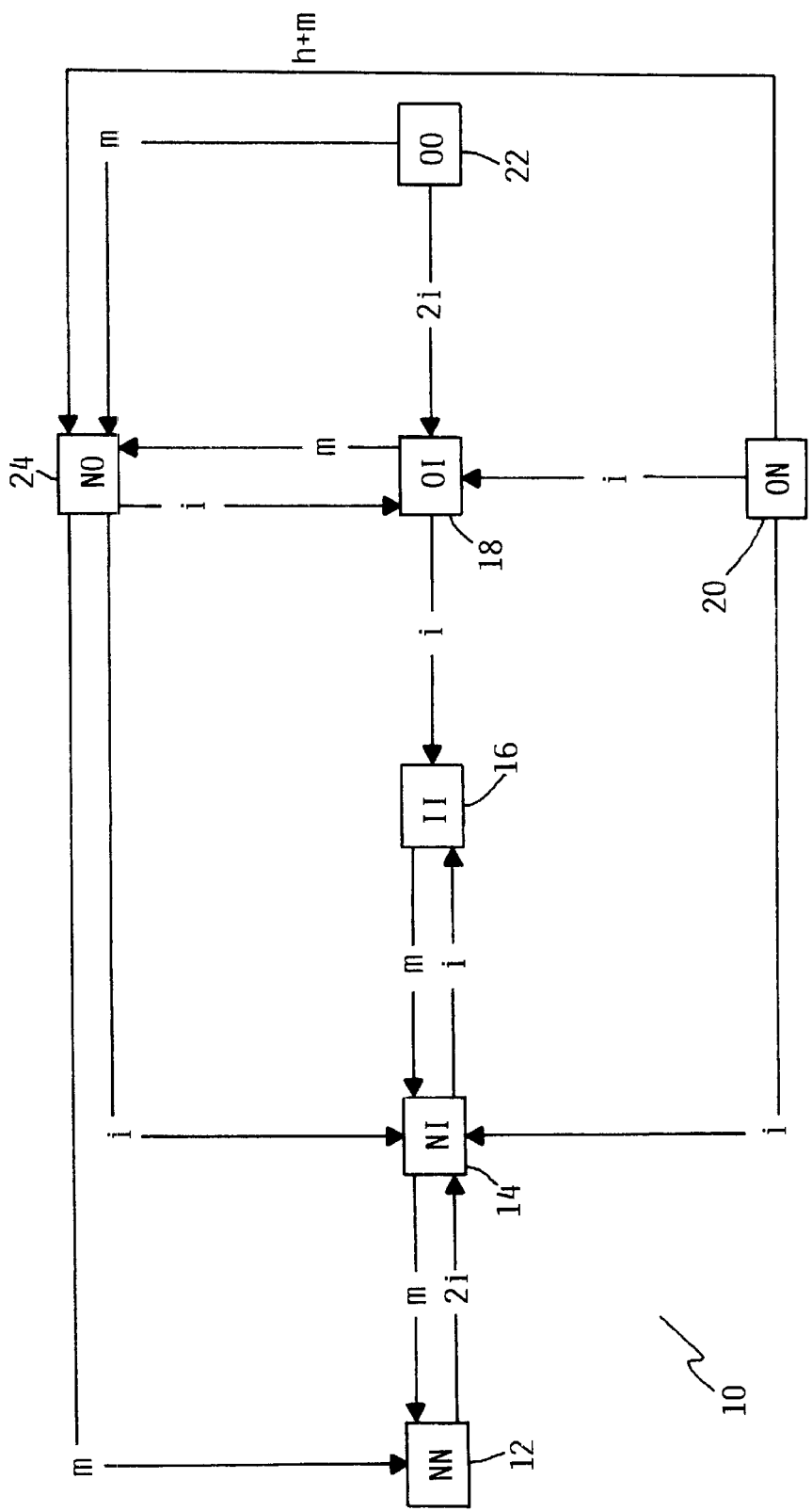
FIG. 1 is a block diagram of a single two line least recently used (LRU) cache, according to the preferred embodiment of this invention, and is suggested for printing on the first page of the issued patent.

Cache memories store data frequently or recently executed by their associated processors. A cache is said to be warm with respect to a particular process when it contains data required for the execution of the process. Conversely, a cache is said to be cold relative to a particular process when it contains little or no data required for the execution of that process. When a cache is cold, access to the cache will miss. Accordingly, the preferred embodiment of the invention teaches a method of building a mathematical model for calculating cache warmth in response to hardware counters and manipulating the state of the system based upon computations derived from the model.

Technical Background

A traditional UNIX process contains a single thread of control. This thread consists of the sequence of executing instructions along with a minimal amount of state variables, such as a program counter. A multiprocessor system in which memory is shared by all processors can execute different processes concurrently each with a single thread of control. A thread is a center of activity or concentration of control in a computer system. Examples of a thread include a processor, process, task, interrupt handler, service producer, co-routine, transaction, or another thread that provides a given locus of control among threads sharing resources of a particular process or task. It is important to note that each process runs in its own memory space and contains a single thread of execution. Accordingly, concurrent process execution is the finest grain of parallelism achievable in a multi-processor environment with singly threaded processes.

A multi-threaded UNIX process contains several threads of control. Each thread in a multi-threaded process consists of the sequence of instructions being executed by that particular thread and a collection of state variables that are unique to the thread. Thus, each thread contains its own program counter. Multiple threads allow for parallelism and concurrent execution within a process when more than one processor is available. A multi-processor system in which memory is shared by all processors can execute different threads from one or more processes concurrently. Accordingly, each process runs in its own memory space as before, but now multiple threads of execution share the same memory space.

Tasks continuously alternate between executing at a processor then releasing this processor. The processor may be released to perform I/O or synchronization operations, in which cases the task is not eligible for scheduling until the operation is completed. The processor may also be released because of quantum expiration or preemption, in which cases the task is suspended to allow execution of another task. When the task returns for execution and is scheduled on a processor, it experiences an initial burst of cache misses. A cache miss occurs when there is a need to access data that is not yet loaded in the cache. The duration of this burst depends in part upon the number of blocks belonging to the task that are already loaded in the processor's cache. A cache counter may be used to count the miss rate for a given process, which may then be used to perform scheduling operations. The lower number of cache misses for a given operation is indicative that the cache contains data related to that process. Efficiency may then dictate that a higher priority should be provided to the process while the cache contains process relevant data and a lower priority be given to other processes which will incur a higher number of cache misses when executed. A cache hit occurs when data is in the cache memory, and the memory is currently loaded with the information which is accessed. Accordingly, the cache miss and hit rates are indicative of the efficiency of execution and determinative of whether the cache has been previously loaded with relevant data.

Conversely, a cache line invalidation occurs when the data in a cache line is modified by one CPU, but the data to be modified is held in other CPU's caches. The copies of the data held in the other CPU's caches must be invalidated, i.e. removed from these other CPU's caches. A cache rollout occurs when some data gets removed from a cache line to make room for newly referenced data, i.e. an old cache line is removed to make room for a new cache line. If the old cache line is later accessed it must be reloaded into the accessing CPU's cache. In conjunction with a cache rollout, an associated cache rollout counter is used for scheduling and enhancing performance efficiency. Generally, when a task is scheduled to run on a processor, it initially experiences a large number of cache misses as its working set is brought from main memory into the cache. A group of cache blocks in active use by a particular task is defined as the footprint in the cache. Accordingly, the hardware associated with cache memories may be utilized to enhance performance and efficiency in scheduling operations of an operating system.

FIG. 1 is an illustration of a Markov Model of a two-line way of a least recently used (LRU) cache 10, where it is assumed that information entering one state is exiting another state. A Markov Model is a queuing theory model that is a well known theory to one of ordinary skill in the art. In this example, the Markov Model is adapted to a two line cache wherein memory can be placed in one of two places. There are three cache line state definitions, N for a new line most recently used by a current process, O for an old line more recently used by a previous process or processes, and I for an invalid line which is available to receive new data without having to destroy or remove data therefrom. In addition, the transitions between the cache line states are defined as the hit rate per line h, the miss rate per line m, and the invalidation rate per line i. Each of the line state definitions are illustrated in conjunction with the transitions between the states. A miss fills an invalid line with data. Otherwise, the miss replaces the least recently used line if neither line in the data set is invalid. A hit does not change the contents of a line. However, a hit does change the least-recently used markings so that a subsequent miss will roll out a different line. An invalidation will remove a line of memory so that the line may be available to receive a new line of memory. Accordingly, these transition definitions enable the lines of memory to be efficiently managed.

There are seven possible states of the cache lines 12, 14, 16, 18, 20, 22 and 24. Reference 12 (NN) illustrates a point where there is no invalid data in the line and no old data in the line. Rather, both sets of data in the line belong to the new process. The converse to 12 (NN) is 22(OO), which illustrates a point where both sets of data in the cache line belong to old process, and therefore may be available to receive new data. In addition to these extreme measures 12 and 22, there are five other states, 14, 16, 18, 20 and 24 as shown in FIG. 1. The state represented by (NI) 14 is illustrative of a state where one data in the line belongs to a new process, and the other data in the line is invalid and available to accept new data. A subsequent miss will fill in the invalid data with new data. The state represented by 16 (II) is illustrative of a state where both data in the cache line are invalid and available to accept new data. A miss extending from this state, (II) 16, will fill the invalid data with new data, and attain the state shown in (NI) 14. The state represented by (OI) 18 is illustrative of a state wherein one of the data in the line is old and the other data is invalid. If one were trying to invalidate the old line of data, this would result in the state (II) 16. Conversely, a miss extending from (OI) 18, would result in the state (NO) 24, where the new line replaces the invalid line and the old line remains in the cache. As shown, (NO) 24, is illustrative of a state with an new line and an old line. A miss extending from (NO) 24 results in the old line being replaced with a new line, as shown at (NN) 12. The state represented by (OO) 22 is illustrative of a state where all states in the cache belong to old process. Therefore, there are two possibilities of invalidating the data, i.e. invalidating both pieces of old data. A need to invalidate either of the pieces of data would result in invalidating one line of data and maintaining an old line of data, as shown at (OI) 18. In addition, a miss extending from (OO) 22 will result in state (NO) 24, where a miss will replace one of the lines of old data with a new line and will maintain an old line of data as well. Finally, the last state represented by (ON) 20, is illustrative of a state of an old line of data and a new line of data. An attempt to invalidate an old line of memory will result in state (NI) 14, whereas a hit or a miss will result in state (NO) 24. The miss will pick a new line from the line referenced longest ago, and the old line most recently referenced will remain. The state represented by (ON) 20 is a unique state in that the new line was last accessed before the new process most recently resumed execution on this processor. An invalidation of the new line, i.e. the least recently used line, will result in state (OI) 18, where the old line remains and the new line has been invalidated. Accordingly, the above defined flow of data among the states available are illustrative of a Markov Model of a single two-line way of a LRU cache.

Given values for hit, h, miss, m, and invalidation, i, and given initial values for the probabilities of a line being in each of the seven states, it is also possible to solve for the probabilities of a line being in one of the seven states as a function of time, wherein a transient solution can be used to estimate a cache footprint of a process and the cache footprint can then be used to enhance scheduling decisions. In the Markov Model, it is understood that what is entering one state is exiting the other state. Accordingly, the following equations are demonstrative of each state:

$$\frac{d}{dt}NO(t) = mOO(t) + (m+h)ON(t) + mOI(t) - (m+2i)NO(t) \quad (1)$$

$$\frac{d}{dt}NN(t) = mNO(t) - 2iNN(t) + mNI(t) \quad (2)$$

$$\frac{d}{dt}NI(t) = iON(t) + iNO(t) + 2iNN(t) - (m+i)NI(t) + mII(t) \quad (3)$$

$$\frac{d}{dt}II(t) = iOI(t) + iNI(t) - mII(t) \quad (4)$$

-continued $$\frac{d}{dt}OI(t) = 2iOO(t) + iON(t) - (m+i)OI(t) + iNO(t) \quad (5)$$

$$\frac{d}{dt}OO(t) = -(m+2i)OO(t) \quad (6)$$

$$\frac{d}{dt}ON(t) = -(m+2i+h)ON(t) \quad (7)$$

where $$I=OO(t)+ON(t)+OI(t)+NO(t)+NN(t)+NI(t)+II(t) \quad (8)$$

In the preferred embodiment, the initial conditions for the hardware can be set in one of two scenarios. The first scenario is used in a cold start where there are no processes of interest which have recently run using this cache. In this example, the initial state of two invalid lines, II, at the outset is set to one, i.e. II(0)=1, and all other possible initial states are set to zero. The second scenario assumes that only two processes are sharing the cache, and an old process has completed running and a new process has just begun. In this scenario, the initial conditions of each of the seven state are derived from the final conditions of the old processes. If there are more than two processes sharing the cache, the assignment from old lines to new lines may be prorated to account for the other processes. However, the result of the proration results in a system of equations requiring a solution of differential equations at each context switch to estimate the cache warmth. One skilled in the art will recognize that there are many other ways of estimating cache warmth, including performing the calculation at 1) fixed intervals (for example, from a scheduling clock interrupt handler), 2) after a specified number of events have been tallied by a hardware counter or set of hardware counters, and 3) at randomly selected points in time. Accordingly, a less ornate solution to estimating cache warmth at each context switch is desired.

Figure 2:
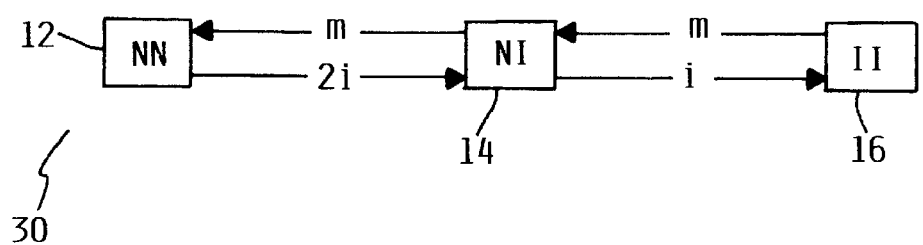
FIG. 2 is a block diagram of a Markov Model of a modified single two line LRU cache.

A transient solution to the equations above can be used to estimate the cache footprint of a process, which in turn can be used to guide scheduling decisions. However, a simpler form of the solutions is possible by assuming that the previous process ran long enough for the cache to reach steady state. At steady state, all of the old states would be empty resulting in the Markov Model illustrated in FIG. 2, shown at 30. Accordingly, FIG. 2 is a portion of FIG. 1 with the elimination of all states having an old line.

The balance equations for the steady state solution of the model illustrated in FIG. 2 are as follows:

$$mNI(\infty)-2iNN(\infty)=0 \quad (9)$$

$$2iNN(\infty)-(m+i)NI(\infty)+mII(\infty)=0 \quad (10)$$

$$i\,NI(\infty)-mII(\infty)=0 \quad (11)$$

$$\text{where } NN(\infty)+NI(\infty)+II(\infty)=1 \quad (12)$$

Given three equations and three variables it is possible to solve for each variable. Solving equations 9, 10, 11 and 12 provides the following:

$$NN(\infty) = \frac{m^2}{m^2 + 2im + 2i^2} \quad (13)$$

$$NI(\infty) = \frac{2im}{m^2 + 2im + 2i^2} \quad (14)$$

$$II(\infty) = \frac{2i^2}{m^2 + 2im + 2i^2} \quad (15)$$

Equations 13, 14 and 15 may then be applied to a transient solution to the Markov Model illustrated in FIG. 1, where the initial conditions are as follows: NO(0)=0, NN(0)=0, NI(0)=0, II(0)=II($\infty$), OI(0)=NI($\infty$), OO(t)=NN($\infty$), and ON(0)=0. These initial conditions substituted into the general solution, wherein the cache warmth, w, is defined as follows:

$$w(t) = NI(t) + NO(t) + 2NN(t) \quad (16)$$

Substituting formulas 13, 14 and 15 to solve for the cache warmth, results in an equation with exponential values. Accordingly, the process of solving formulas with exponential values becomes quite cumbersome on each context switch and as such is not appropriate for efficient computation, given currently foreseen advances in CPU performance.

The approach to the Markov Model illustrated in FIG. 2 requires mathematical computations, which may be considered cumbersome. In addition, the assumption that the preceding process reached steady state does not hold in many I/O bound commercial workloads. It may be recognized to one skilled in the art that there are other ways of estimating cache warmth, including performing the calculation at (1) fixed intervals, i.e. from a scheduling clock interrupt handler, (2) after a specified number of events have been tallied by a hardware counter or set of hardware counters, and (3) at randomly selected points in time. However, it should be understood that in many cases the exact degree of cache warmth is not as important as a general measure of the life expectancy of a given process's cache state. The average lifetime of a given cache line may be computed by using the notion of recurrence time from queuing theory, where it is understood that the NI, NN and II states are absorbing states. Once any of these states has been reached, the old cache lines can not be reloaded until the corresponding process runs again. Therefore, the average time duration required to reach one of these absorbing states may be calculated by assuming that one action is required to move from one state to another. This assumption permits the average lifetime to be computed using a linear system of equations as follows:

$$2iNN = 2iNI + 1 \quad (17)$$

$$(m+i)NI = mNN + iII + 1 \quad (18)$$

$$mII = mNI + 1 \quad (19)$$

$$(m+i)OI = mNO + iII + 1 \quad (20)$$

$$(m+2i)OO = 2iOI + mNO + 1 \quad (21)$$

$$(m+2i)NO = iOI + mNN + iNI + 1 \quad (22)$$

Since it is being assumed that all old cache lines are considered dead once they arrive at these state, NN, NI and II are set to zero. As such, the first three equations outlined above are removed from consideration and factors in the mathematical model, and the remaining three equations can be reconstructed as follows:

$$(m+i)OI = mNO + 1 \quad (23)$$

$$(m+2i)OO = 2iOI + mNO + 1 \quad (24)$$

$$(m+2i)NO = iOI + 1 \quad (25)$$

If we combine the three equations 23, 24 and 25 above, the values for OI, OO and NO can then determined based upon the miss and invalidations rates as follows:

$$OI = \frac{2(m+i)}{m^2 + 2im + 2i^2} \quad (26)$$

$$OO = \frac{2m^2 + 8im + 6i^2}{m^3 + 4im^2 + 6i^2m + 4i^3} \quad (27)$$

$$NO = \frac{m + 2i}{m^2 + 2im + 2i^2} \quad (28)$$

In view of the fact that the exponential factor has now been removed, there are only simple arithmetic functions remaining, i.e. addition, subtraction, multiplication, and division. Each of equations 26, 27 and 28 may then be reformulated to solve for the expected cache lifetime of each of the states involving an old cache line in terms of misses per invalidate, defined as $\rho$.

Equations 26, 27 and 28 defined in terms of $\rho$, are as follows:

$$OI = \frac{2\rho + 2}{i(\rho^2 + 2\rho + 2)} \quad (29)$$

$$OO = \frac{2\rho^2 + 8\rho + 6}{i(\rho^3 + 4\rho^2 + 6\rho + 4)} \quad (30)$$

$$NO = \frac{\rho + 2}{i(\rho^2 + 2\rho + 2)} \quad (31)$$

Equations 29, 30 and 31 are desirable when there are more invalidations than misses. Alternatively, each of equations 26, 27 and 28 may be reformulated to solve for the expected cache lifetime of each of the states involving an old cache line in terms of invalidates per miss, defined as $\upsilon$. Equations 26, 27 and 28 defined in terms of $\upsilon$, are as follows:

$$OI = \frac{2v + 2}{m(2v^2 + 2v + 1)} \quad (32)$$

$$OO = \frac{6v^2 + 8v + 2}{m(4v^3 + 6v^2 + 4v + 1)} \quad (33)$$

$$NO = \frac{2v + 1}{m(2v^2 + 2v + 1)} \quad (34)$$

Equations 32, 33 and 34 are desirable when misses exceed invalidations. The terms defining misses per invalidate, $\rho$, and invalidates per miss, $\upsilon$, are reciprocal of each other. Accordingly, the relative simplicity associated with these variables allow the miss and invalidation rate to be computed on each context switch so that the efficient scheduling of processor threads may be further enhanced.

Figure 3:
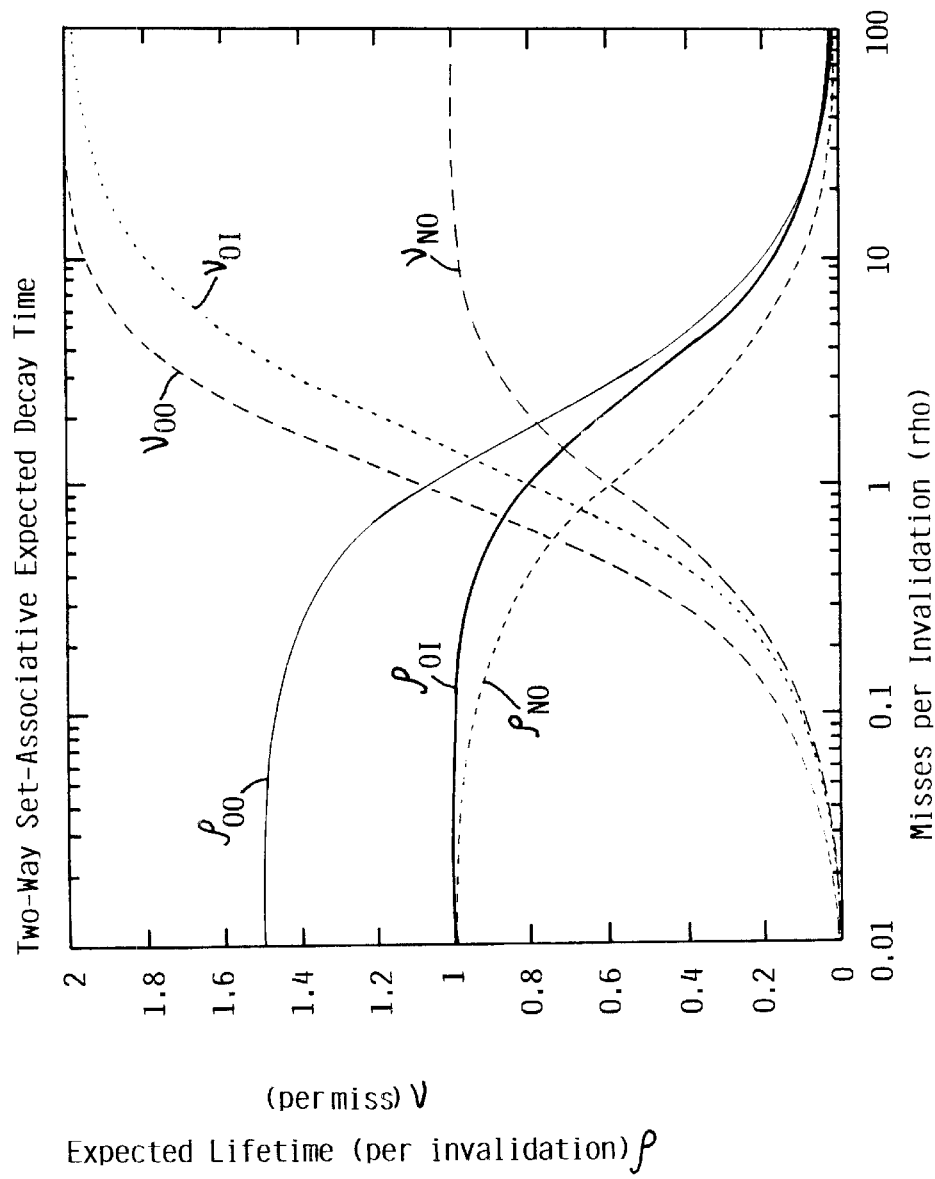
FIG. 3 is a graph of a two-way set-associative expected decay time of a cache thread.

FIG. 3 is a graph illustrating the two-way set associative expected decay time of a cache line. The lines extending from the left portion of the vertical axis are illustrative of formulas 29, 30 and 31, wherein the vertical axis represents the lifetime per invalidation, and the horizontal axis represents the misses per invalidation, and the lines extending from the right portion of the vertical axis are illustrative of formulas 32, 33 and 34, wherein the vertical axis represents the lifetime per miss, and the horizontal axis represents the misses per invalidation. Each of lines in FIG. 3 may be tabulated into a look-up table format wherein the cache warmth may be estimated from the lifetimes by assuming exponential decay of a cache line. Accordingly, the estimates of a cache line may be used to estimate an initial population for a subsequent process on the operating system processor.

Advantages Over The Prior Art

Figure 4:
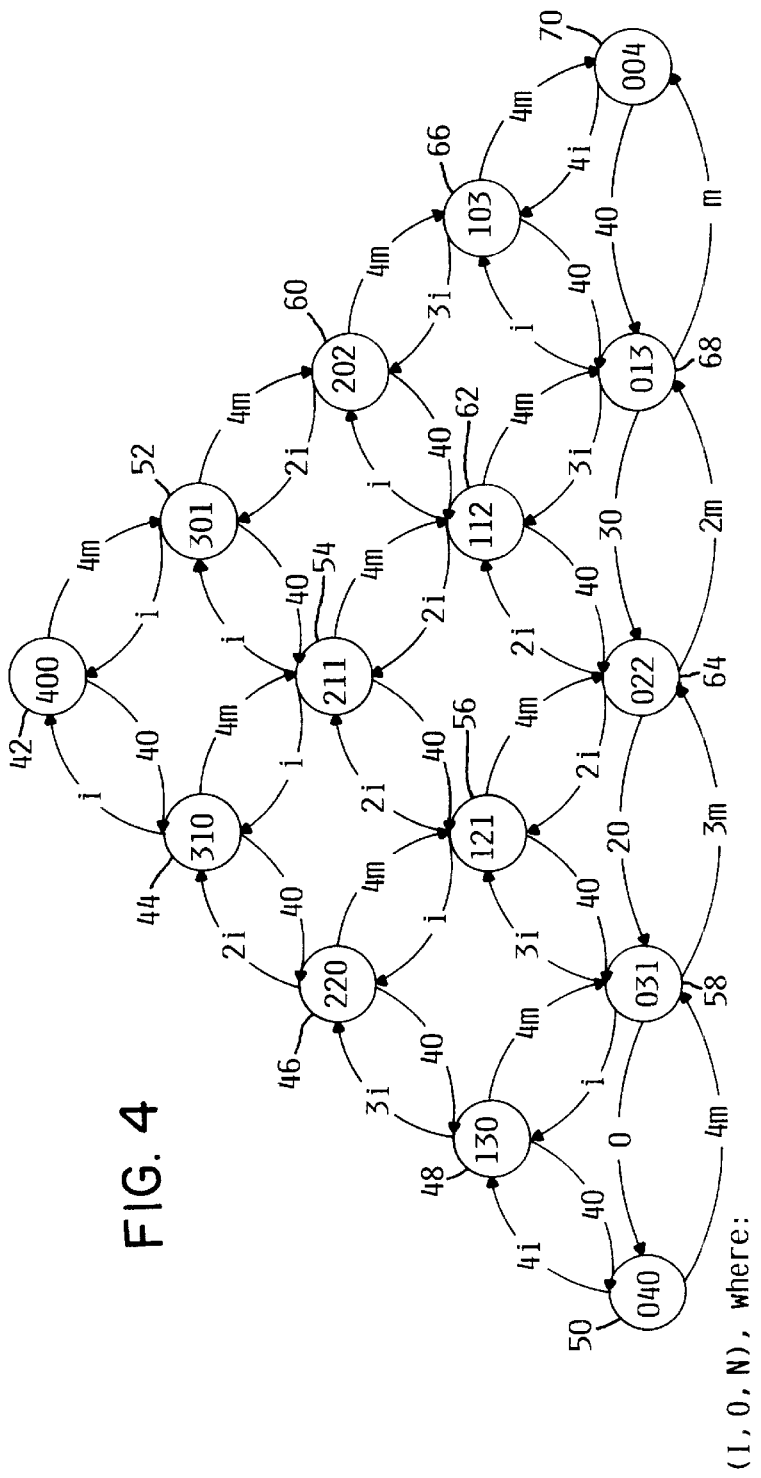
FIG. 4 is a block diagram of a Markov Model of a four line transient cache.

The preferred embodiment of the invention differs significantly from the traditional cache affinity algorithms by computing a nominal lifetime of a given cache line. Based upon the expected life and decay time of a cache line, the hardware counters available to the operating system may be utilized to drive the mathematical model emanating from the Markov Model of queuing theory as illustrated in FIGS. 2 and 4, for both a two way set associative expected cache decay time and a four way set associative expected cache decay time, respectively. By tabulating the misses per invalidate curves and invalidates per miss curves of FIGS. 3 and 5, the computation of miss and invalidation rates may be reduced to a table look-up. The estimates of the cache lifetime provided in a look-up table may be used to estimate initial population for a new process, scheduling processes on a processor, transferring processes between processors, moving data among processor nodes, and retargetting interrupt handlers from one processor to another. By enabling the calculation of an expected lifetime of a cache line, the efficiency and operation of a processor is enhanced. The hardware counters are used as in the prior art to provide information pertaining to cache misses, cache invalidations, cache hits and cache roll-outs. Accordingly, the information gathered from the counters in combination with the mathematical model derived from the Markov Model enables efficient management of a processor.

The method and system disclosed and described herein may be useful in a NUMA machine, and can also be used in a UMA or any SMP. The method of estimating cache warmth may be used for process scheduling, relocating cache, memory management, movement and/or relocation. Accordingly, the method and system disclosed herein is applicable to a variety of machines with exact or estimated hardware measurements.

Alternative Embodiments

The same technique as disclosed in the preferred embodiment of the invention for a two line LRU cache may be applied to higher associativity caches. For example, FIG. 4 is a chart 40 illustrating a transient cache fill Markov Model for a four way set-associative cache. In each box 42–70, the first number at the left represents the number of invalid cache lines, the numeral in the middle represents the number of old cache lines, and the numeral on the right represents the number of new cache lines. The transitions between the cache line states are defined as the miss rate per line m, the invalidation rate per line i, and the other CPU's miss rate per line o. Each of the line state definitions are illustrated in conjunction with the transitions between the states. As with the two line LRU cache, the assumption is made that certain states are absorbing states, and once one of these states has been reached, the old cache lines can never be reloaded until the corresponding process runs again. Based upon the assumption made with respect to the two line system, a set of equations may be developed to compute the expected cache lifetime of each of the states involving an old cache line in terms of misses per invalidate, $\rho$, and invalidates per miss, $\upsilon$. Accordingly, there are fifteen possible states of the cache lines, of which there are ten linear equations for computing the expected cache lifetime of each of the states involving an old cache line in terms of misses per invalidate, $\rho$, and invalidates per miss, $\upsilon$.

Figure 5:
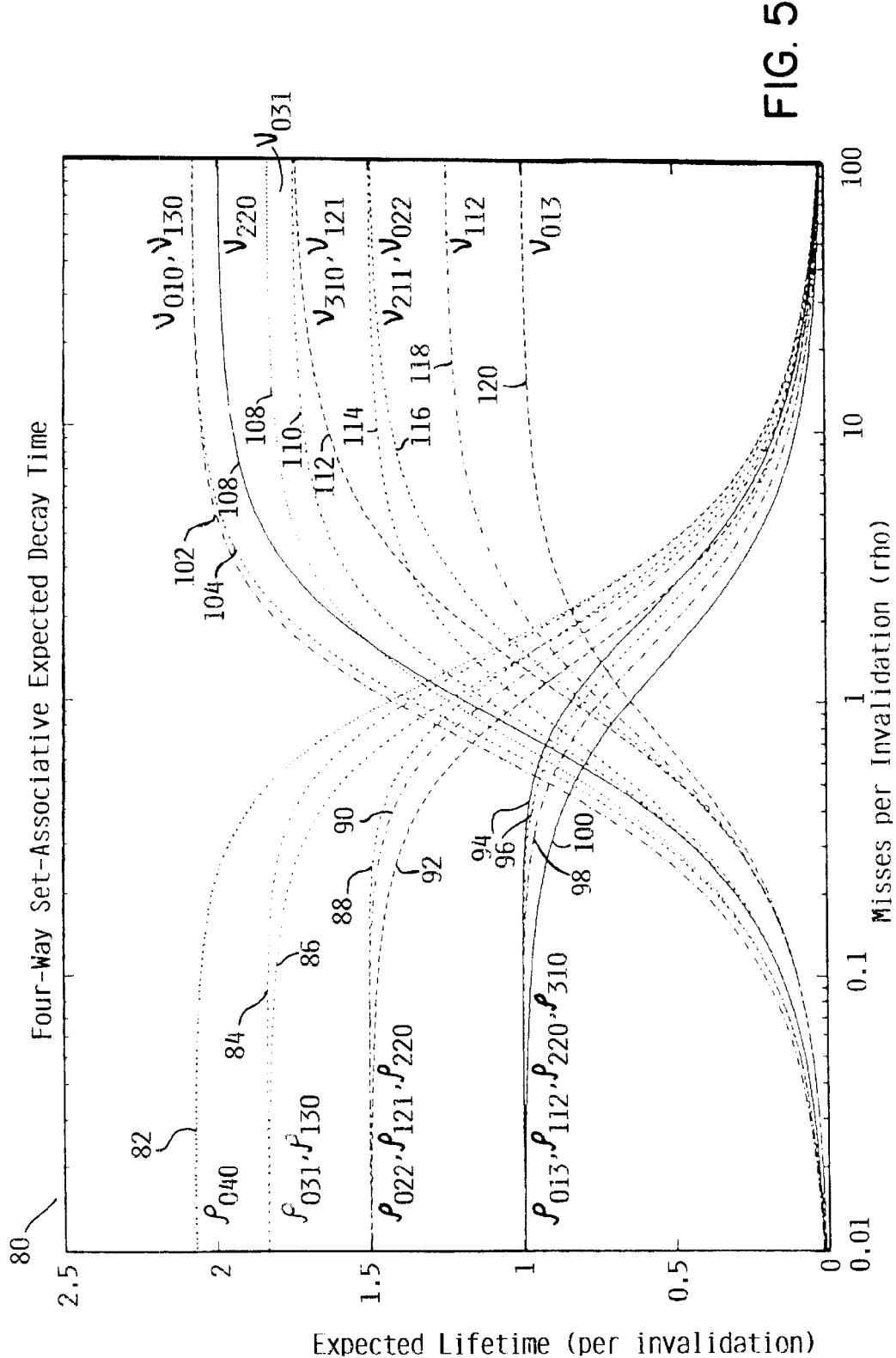
FIG. 5 is a graph of a four way set associative expected decay time of a cache thread.

The four way associativity may be beneficial for cache geographically further away from the CPU, whereas the two-way set associativity may be more productive for cache geographically closer to the CPU. FIG. 5 is a graph 80 illustrating a four way set associative expected decay time of cache from the Markov Model of FIG. 4, with the assumption that certain states are absorbing states, and once one of these states has been reached, the old cache lines can never be reloaded until the corresponding process runs again. Lines 82, 84, 86, 88, 90, 92, 94, 96, 98 and 100 are illustrative of the misses per invalidate for the states represented by 50, 58, 48, 64, 56, 46, 68, 62, 54 and 44, respectively, wherein the vertical axis represents the lifetime per invalidation, and the horizontal axis represents the misses per invalidation. Likewise, lines 102, 104, 106, 108, 110, 112, 114, 116, 118 and 120 are illustrative of the invalidations per miss for the states represented by 50, 48, 46, 58, 44, 56, 54, 64, 62 and 68, respectively, wherein the vertical axis represents the lifetime per miss and the horizontal axis represents the misses per invalidation. Accordingly, the estimates of a cache line may be tabulated into a look-up table, wherein the cache warmth may be estimated to project an initial population for a subsequent process on the operating system processor.

Finally, the two embodiments disclosed pertain to two way and four way set associative caches. In addition, it is also possible to approximate cache warmth of a high associativity system with the solutions for a lower associativity system. With each scenario, the cache warmth is estimated based upon an expected life and decay time of a cache line. This estimate is then used to manipulate the state of the system. Accordingly, the embodiments disclosed herein provide a basis for scheduling processes on a processor, transferring processes between processors, moving data among processor nodes, and retargetting interrupt handlers from one processor to another based upon cache hits, misses, invalidations and roll-outs, on a two way, four way and higher set-associative cache systems.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method for operating a computer system comprising the steps of:
    (a) mathematically modeling cache warmth responsive to a hardware counter of a processor in the system;
    (b) computing a nominal lifetime of a cache line based upon said model; and
    (c) manipulating the state of the system based upon the lifetime.

2. The method of claim 1, wherein said manipulation step includes scheduling processes on a processor.

3. The method of claim 1, wherein said manipulation step includes transferring processes between processors.

4. The method of claim 1, wherein said manipulation step includes moving data among processor nodes.

5. The method of claim 1, wherein said manipulation step includes retargetting interrupt handlers from one processor to another.

6. The method of claim 1, wherein the counter counts measurements selected from a group consisting of: cache misses, cache invalidations, cache hits, cache roll-outs, and combinations thereof.

7. The method of claim 1, wherein the step of mathematically modeling is based on a Markov Model of queuing theory.

8. The method of claim 7, further comprising the step of creating a set of linear equations from said Markov Model.

9. The method of claim 8, further comprising the step of building a look-up table from said linear equations.

10. The method of claim 1, wherein said step of mathematically modeling cache warmth comprises the step of estimating cache warmth assuming exponential decay.

11. The method of claim 10, further comprising the step of estimating an initial population of said cache for a subsequent process based upon the cache warmth estimate.

12. The method of claim 1, wherein said manipulation step includes prorating cache line assignments for shared cache.

13. A computer system, comprising:
multiple processors, each processor having an associated cache;
hardware counters for measuring state of the cache;
means for building a mathematical model for estimating cache warmth, said means being responsive to said hardware counters;
means for manipulating the state of the system based upon said cache warmth estimate;
wherein said means for building said mathematical model comprises computing an average lifetime of a given cache line.

14. The system of claim 13, wherein said means for building said mathematical model further comprises assuming exponential decay.

15. The system of claim 13, wherein said hardware counters measure state of the cache selected from a group consisting of: cache hits, cache misses, cache invalidations, cache roll-outs, and combinations thereof.

16. The system of claim 14, wherein said mathematical model incorporates a Markov Model of queuing theory.

17. The system of claim 16, wherein said Markov Model further comprises modeling an expected decay time in a two way set associative that uses a least-recently used replacement policy.

18. The system of claim 16, wherein said Markov Model further comprises modeling an expected decay time in a four way set associative cache that uses a pseudo-random replacement policy.

19. The system of claim 13, wherein said manipulation means is selected from a group consisting of: scheduling processes on a processor, transferring processes between processors, moving data among processor nodes, retargetting interrupt handlers from one processor to another, prorating cache line assignments, and combinations thereof.

20. A computer system, comprising:
multiple processors, each processor having an associated cache;
hardware counters for measuring state of the cache;
a mathematical model for estimating cache warmth, wherein said model is responsive to hardware measurements;
said cache warmth estimate manipulating the state of the system;
wherein said model comprises computing a nominal lifetime of a given cache line.

21. The system of claim 20, wherein said model comprises estimating cache warmth assuming exponential decay of cache.

22. The system of claim 20, wherein said hardware counters measure state of the cache selected from a group consisting of: cache hits, cache misses, cache invalidations, cache roll-outs, and combinations thereof.

23. The system of claim 20, wherein said mathematical model comprises a Markov Model of queuing theory.

24. The system of claim 23, further comprises modeling an expected decay time in a two way set associative that uses a least-recently used replacement policy.

25. The system of claim 23, further comprises modeling an expected decay time in a four way set associative cache that uses a pseudo-random replacement policy.

26. The system of claim 20, wherein said manipulation of the state of the system is selected from a group consisting of scheduling processes on a processor, transferring processes between processors, moving data among processor nodes, retargetting interrupt handlers from one processor to another, prorating cache line assignments, and combinations thereof.

27. An article comprising:
a computer-readable medium having stored thereon computer executable instructions;
means in the medium for obtaining data from a hardware counter;
means for building a mathematical model for estimating cache warmth;
means for computing a nominal lifetime of a cache line based upon said model; and
means in the medium for manipulating the state of the system based upon said cache warmth estimate.

28. The article of claim 27, wherein the medium is a recordable data storage medium.

29. The article of claim 27, wherein the medium is a modulated carrier signal.

30. The article of claim 27, wherein said manipulation means schedules processes on a processor.

31. The article of claim 27, wherein said manipulation means transfers processes between processors.

32. The article of claim 27, wherein said manipulation means moves data among processor nodes.

33. The article of claim 27, wherein said manipulation means retargets interrupt handlers from one processor to another.

34. The article of claim 27, wherein said data obtaining means measures state of the cache selected from the group consisting of cache misses, cache invalidations, cache roll-outs, and cache hits.

35. The article of claim 27, wherein said means for building a mathematical model uses a Markov Model of queuing theory.

36. The article of claim 27, wherein said cache warmth estimate assumes exponential decay of cache.

37. The article of claim 27, wherein said manipulation means prorates cache line assignments for shared cache.

* * * * *